United States Patent [19]

Zezza et al.

[11] Patent Number: 5,007,460
[45] Date of Patent: Apr. 16, 1991

[54] ADJUSTABLE NOZZLE DAM ASSEMBLY AND METHOD OF INSTALLING SAME

[75] Inventors: Louis J. Zezza, Brookfield; Frank Fiorelli, Danbury, both of Conn.

[73] Assignee: Nuclear Energy Services, Inc., Danbury, Conn.

[21] Appl. No.: 331,794

[22] Filed: Apr. 3, 1989

[51] Int. Cl.⁵ .............................................. F16L 55/12
[52] U.S. Cl. ......................................... 138/89; 138/93; 376/204; 29/723; 29/462
[58] Field of Search ............................ 138/89, 90, 93; 376/203, 204; 29/402.02, 723, 726, 890.14, 462, 469; 165/71

[56] References Cited

U.S. PATENT DOCUMENTS

| | | | |
|---|---|---|---|
| 4,214,760 | 7/1980 | Godfrey | 138/89 |
| 4,637,588 | 1/1987 | Wilhelm et al. | 138/93 |
| 4,667,701 | 5/1987 | Evans et al. | 138/93 |
| 4,671,326 | 6/1987 | Wilhelm et al. | 138/93 |
| 4,690,172 | 9/1987 | Everett | 138/89 |
| 4,753,768 | 6/1988 | Riri | 138/89 |
| 4,777,008 | 10/1988 | Shirasu | 138/89 |
| 4,848,406 | 7/1989 | Staurer et al. | 138/93 |
| 4,850,599 | 7/1989 | Parmax | 138/89 |

*Primary Examiner*—James E. Bryant, III
*Attorney, Agent, or Firm*—Charles J. Brown

[57] ABSTRACT

In a nozzle dam assembly wherein a circular dam faces into a nozzle adjacent its opening and a support frame abuts the backside of the dam and is removably affixed across a ring encircling the opening, apparatus for selectively locating the dam at its optimum sealing position within the nozzle notwithstanding the particular longitudinal profile of the nozzle or eccentricity of the ring-relative to the nozzle opening comprising apparatus for adjusting the dam relative to the frame along the nozzle axis and also vertically and horizontally perpendicular to the nozzle axis.

15 Claims, 5 Drawing Sheets

ADJUSTABLE NOZZLE DAM ASSEMBLY AND METHOD OF INSTALLING SAME

BACKGROUND OF THE INVENTION

Following commercial introduction of a nozzle dam assembly described in U.S. Pat. Nos. 4,656,714 and 4,667,701, certain advances were made in its design which are now in the prior art. The common purpose of those design modifications and the present invention is to minimize personnel radiation exposure during installation by reducing installation time and to make the nozzle dam as fail-safe as possible without compromising the structural integrity of the nozzle or generator wall.

In the patented design referred to above the dam was assembled on a support frame from segments encircled by a sealing diaphragm and the assembly was then rotated into sealing position within the nozzle. One subsequent prior art modification to that patented design was to assemble the dam segments in place within the nozzle and then attach as many as 18 clamp devices around its periphery to hold it to a special clamp ring encircling the nozzle opening. The diaphragm was preaffixed to the center dam segment in that design, as it is in the present invention as well, but no support frame was utilized behind the dam and no provision was made for adjusting the operating position of the dam to the particular dimensional characteristics of the nozzle.

Another of the prior art modifications referred to above was the assembly of the dam within the nozzle opening by first installing the sealing diaphragm by itself on bosses previously welded to or screwed into the nozzle wall, then inserting the various dam segments and attaching them to the flange ring by clamps as in the first-described modification, and finally spanning the backside of the assembled dam with support beams which were releasably attached to the bosses by quick-release bayonet pin devices. While a support frame transverse to the dam segments was included in that design, as it is in the present invention, the welded or threaded bosses on the nozzle wall itself necessitated stress analyses after the bosses were put in place to insure that the nozzle wall structural integrity had not been compromised. Also there was no provision for adjusting the operating position of the dam to the particular dimensional characteristics of the nozzle.

Yet another of the prior art modifications referred to above involved the use of a hold-down ring welded directly to the nozzle to receive the nozzle dam segments with their diaphragm seal. A number of lock pins on the dam segments were utilized to secure the dam to the hold-down ring. Again, the sealing diaphragm was preaffixed to the center dam segment, as in the present invention, but there was no provision for adjusting any of the components to the particular dimensional characteristics of the nozzle.

the average installation time for most prior art nozzle dams has remained in the order of five minutes. With the higher radiation levels which are now common there is a great need for reducing that duration of personnel radiation exposure during installation. When personnel assemble the dam components of the invention directly in the nozzle opening and secure them by a transverse support frame they can complete the installation in as little as two minutes with certainty that the dam is located at its optimum sealing position within the nozzle notwithstanding the particular nozzle profile and the particular eccentricity of the fixed flange ring relative to the nozzle opening.

SUMMARY OF THE INVENTION

The nozzle dam assembly of the invention is intended for use in nozzles having nominally varying longitudinal profiles flaring to circular wall openings about which are fixed flange rings of nominally varying eccentricity relative to such openings. The assembly includes a circular dam adapted to face into and seal the associated nozzle adjacent its opening and it also includes a support frame abutting the backside of the dam and adapted to be removably affixed across the associated ring. The improvement of the invention comprises adjustment means for selectively locating the dam at its optimum sealing position within the nozzle notwithstanding the particular nozzle profile and the particular eccentricity of the ring relative to the opening. Adjustable hanger bar means are provided which are adapted to rest slideably on the ring while supporting the dam in selected depth positions along the nozzle axis. Adjustable abutment means are included on the frame which restrain the dam against outward movement along the nozzle axis from the selected depth position determined by the hanger means but permitting movement of the dam in a plane perpendicular to the nozzle axis. Adjustable plate means are provided which support the hanger bar means and dam in selected vertical positions perpendicular to the nozzle axis. Finally, pin means are provided which are adapted to be affixed to the ring and support the adjustment plate means and hanger bar means and dam in selected horizontal positions perpendicular to the nozzle axis.

In a preferred form of the invention the dam is of composite form adapted to be assembled directly in the nozzle opening and the improvement of the invention further comprises a center dam segment disposable diametrically relative to the opening with one of said adjustment means at each end thereof and a chordal end dam segment locatable to each side of and adjoining the center segment. In this embodiment a circular sealing diaphragm is affixed to the center segment and is disposable around the periphery of and across all the segments. Bar means are included adapted to be aligned with and to interconnect the segments and engage the adjustable abutment means on the frame, the frame being disposed transverse to the dam segments and bar means. By this construction the adjustment means are first set in conformity with the particular nozzle profile and the particular eccentricity of the ring relative to the opening. Next the center segment is located on the ring by pin means with the diaphragm preaffixed. Thereafter the end segments are connected alongside the center segment and against the diaphragm. Finally the support frame is attached to the ring transverse to the bar means.

In another preferred form of the invention the hanger bar means comprises mounting plates diametrically opposed on the dam each having holes therein aligned in a row adapted to be parallel to the nozzle axis. Hanger plates are provided slideably engaging the respective mounting plates and each also having holes therein aligned in a row adapted to be parallel to the nozzle axis so that selected pairs of the holes in the hanger and mounting plates can be registered with one another. Connecting means are included insertable through the registered pairs of holes to secure the hanger and mounting plates together. The hanger plates rest on the ring so that the mounting plates and dam are supported in selected depth positions along the nozzle axis depending upon the selected pair of registered holes in which the connecting means are inserted.

In another preferred embodiment of the invention the adjustable abutment means comprises a plurality of adjustment screws threaded into the frame and presenting abutment ends to the backside of the dam in sliding engagement therewith. Lock means are on the respective adjustment screws for locating the abutment ends coplanar with one another to restrain the dam against outward movement along the nozzle axis.

The adjustable plate means in another preferred embodiment of the invention comprises tie bar affixed to the hanger bar means on diametrically opposite sides of the dam. Adjustment plates are disposed across the respective tie bars adapted to be in a plane perpendicular to the nozzle axis. Screw and vertical slot means in each pair of the adjustable plates and tie bars are included for locating the two together with the adjustment plates in a selected vertical position perpendicular to the nozzle axis.

In another embodiment of the invention the pin means comprises pins insertable in holes on diametrically opposite sides of the ring and horizotal slots are provided in the adjustable plate means into which the respective pins extend. Means are included for locking each pin in a selected fixed position in its respective horizontal slot.

In accordance with the aforementioned prior art the support frame may include parallel beams adapted to span the ring which are pantographically interconnected by pivot bars and with bayonet pin means on the end of the beams attachable to bayonet pin receiving means located at fixed positions around the ring. In that form of the invention means are included which vary the location of at least some of the interconnections between the beams and pivot bars and also with adjustable eccentric bushings within which at least some of the bayonet pin means are mounted on the beam ends. As a result the bayonet pin means on the beams are registerable with the bayonet pin receiving means on the ring notwithstanding variations in the positions of the bayonet pin receiving means on the ring.

The invention also provides a method of installing a circular dam at an optimum sealing position in a nozzle both along the nozzle axis and also horizontally and vertically perpendicular to the nozzle axis. The nozzle has a particular longitudinal profile flaring to a circular wall opening about which is fixed a flange ring of a particular eccentricity relative to the opening, and the dam is abutted on its backside when in sealing position by a support frame removably affixed across the ring. The method comprises adjusting hanger bar means on the dam so that when the hanger bar means rests slideably on the ring the dam is in its optimum depth position along the nozzle axis. A further step is to adjust abutment means on the frame so that when the dam is in that optimum depth position it is restrained from outward movement along the nozzle axis but is permitted to move in a plane perpendicular to the nozzle axis. An adjustment is also made in plate means which support the hanger bar means and dam so that the dam is in its optimum vertical sealing position perpendicular to the nozzle axis. The plate means and hanger bar means and dam are supported by pin means affixed to the ring and the method includes the step of adjusting the plate means relative to the pin means so that the dam is in its optimum horizontal sealing position perpendicular to the nozzle axis.

DESCRIPTION OF PREFERRED EMBODIMENT

Reference may be had to aforementioned U.S. Pat. No. 4,667,701 for a detailed description of a reactor nozzle and its opening into a chamber which requires sealing by a nozzle dam when the reactor is flooded during shutdowns.

Figure 1:
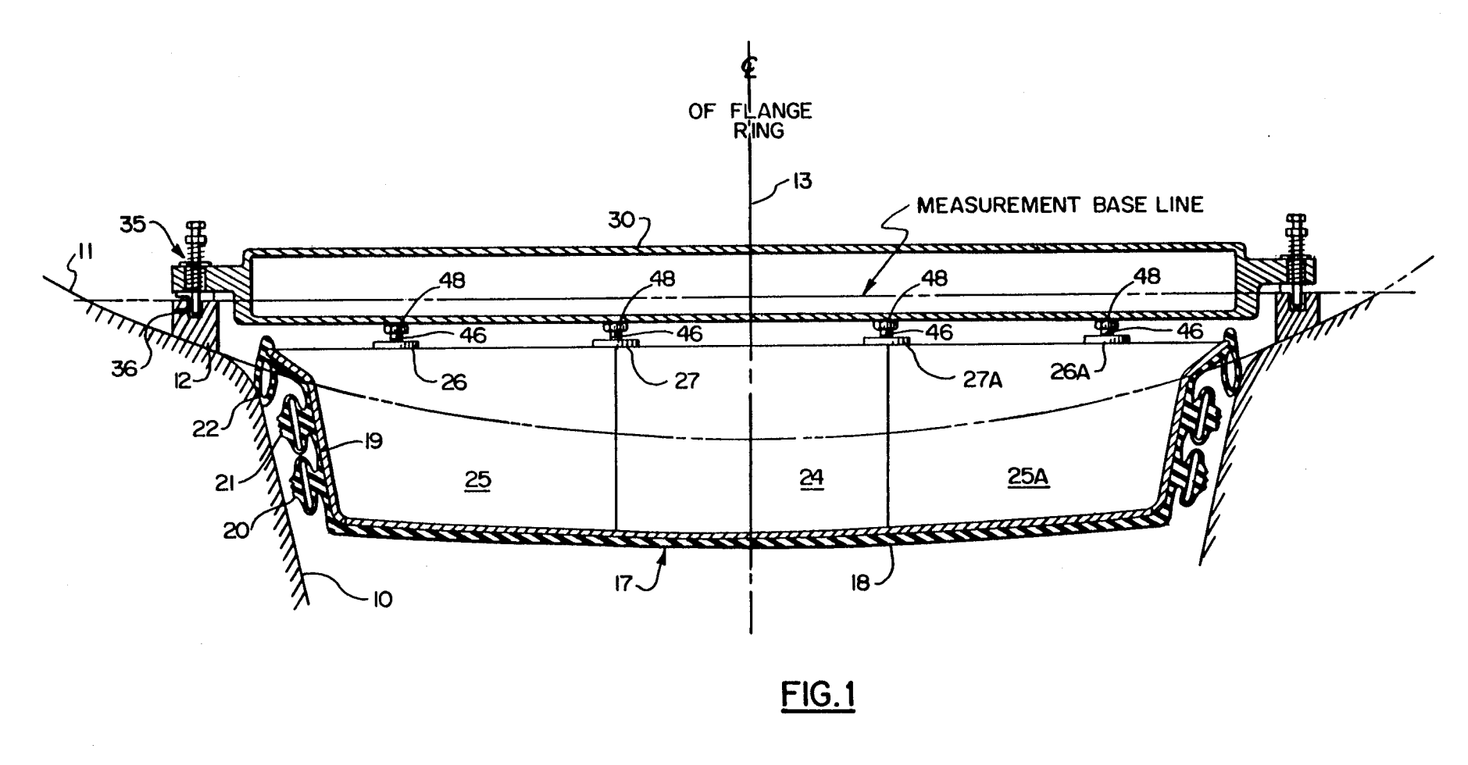
FIG. 1 is a longitudinal section taken through the opening of the nozzle with certain though not all of the principal parts of the dam and support frame of the invention shown in the installed position.

FIG. 1 herein shows such a nozzle wall 10 of circular cross section flaring to a circular opening in a cylindrical chamber wall 11. A flange ring 12, typically of stainless steel, is permanently welded on the wall 11 around the circular opening defined by the nozzle 10. The ring has an array of holes drilled in its outer face parallel to the nozzle axis 13. It is the principal object of the invention to provide an apparatus and method for sealing the opening of the nozzle 10 against fluid pressure acting from within the nozzle through the opening and into the chamber defined by the wall 11. In the following description of a preferred embodiment there are many references to spatial coordinates in terms of depth, horizontal and vertical directions. It is to be understood that the axis 13 of the nozzle 10 shown in FIG. 1 is the coordinate of depth. In a plane perpendicular to the axis 13 are horizontal and vertical coordinates best shown in FIG. 2. The horizontal coordinate extends from 3:00 to 9:00 o'clock and the vertical coordinate extends from 12:00 to 6:00 o'clock. For reasons which will become apparent the embodiment herein described is one with a horizontal rather than a vertical support frame, but it is to be understood that the entire assembly could be rotated ninety degrees with a vertical support frame. Reference herein to horizontal and vertical are therefore not to be thought of in the absolute with respect to ground but rather as X and Y coordinates at right angles to one another in a plane perpendicular to the Z axis of depth in the nozzle.

The dam assembly of the invention includes as the primary sealing element a diaphragm 17 of elastomeric material shown in lateral section in FIG. 1. It includes a circular face 18 and a rim 19. Around the rim 19 are three redundant seals, first an inflatable pneumatic wet seal 20, second an inflatable pneumatic dry seal 21 and third a passive backup seal 22. The inflatable seals are independently pressurized through separate hoses 23 shown in FIG. 2 equipped with quick-connect fittings 24 for connection to a remotely located pressure source. Before the pneumatic seals 20 and 21 are actuated during installation it is important that the diaphragm 17 be at an optimum position of maximum depth within the nozzle 10 and of correct concentricity with respect to the horizontal and vertical axes to insure a reliable seal. The gap before inflation between the faces of the seals 20 and 21 and the surface of the nozzle 10 should not exceed about one-quarter inch.

The present invention provides means for initially supporting the diaphragm 17 in the nozzle 10 in such an optimum position regardless of variations in the longitudinal profile of the nozzle 10 and any out-of-round configuration of the opening of the nozzle and of the flange ring 12 encircling it. It involves a preliminary procedure which does not in itself form part of this invention and that is to generate a vertical and horizontal profile of the actual nozzle in which the dam assembly of the invention is to be installed. This may be done by various measurement methods, one of which includes moving a series of translatable contour pins from a measurement base line (see FIG. 1) into contact with the flared wall of the nozzle at diameterically opposite positions both along the horizontal axis and the vertical axis. Whatever may be the method employed, the purpose is to ascertain beforehand just what is the particular flared configuration of the nozzle 10 so that adjustments in accordance with the invention may be made beforehand in the position of the diaphragm 17 relative to its support frame. The apparatus and method of the invention provides for these adjustments within a tolerance of approximately plus or minus one-half inch on the vertical and horizontal axes and approximately one-half inch upward and two inches downward on the depth axis.

The dam assembly includes a center dam segment 24 disposable diameterically relative to the nozzle opening and chordal end dam segments 25 and 25A locatable to each side of and adjoining the center segment 24. The sealing diaphragm 17 is affixed to the center segment 24 and is disposable around the periphery of and across all of the segments 24, 25 and 25A. Reference may be had to U.S. Pat. No. 4,667,701 for a detailed description of the general form of such segments.

When the dam segments are installed in the manner described hereinafter they are interconnected by a pair of center bars 27 and 27A which are positioned by locating pins 28 and 28A at each end thereof in appropriate registering sockets in the center segment 24 and the end segments 25 and 25A adjacent their respective lines of abutment. The center bars serve as quick-connect means to join the three segments together when the end segments are placed in the diaphragm 17 alongside the center segment. Outer bars 26 and 26A are pemanently affixed parallel to the center bars 27 and 27A on the end segments 25 and 25A.

Figures 2, 9:
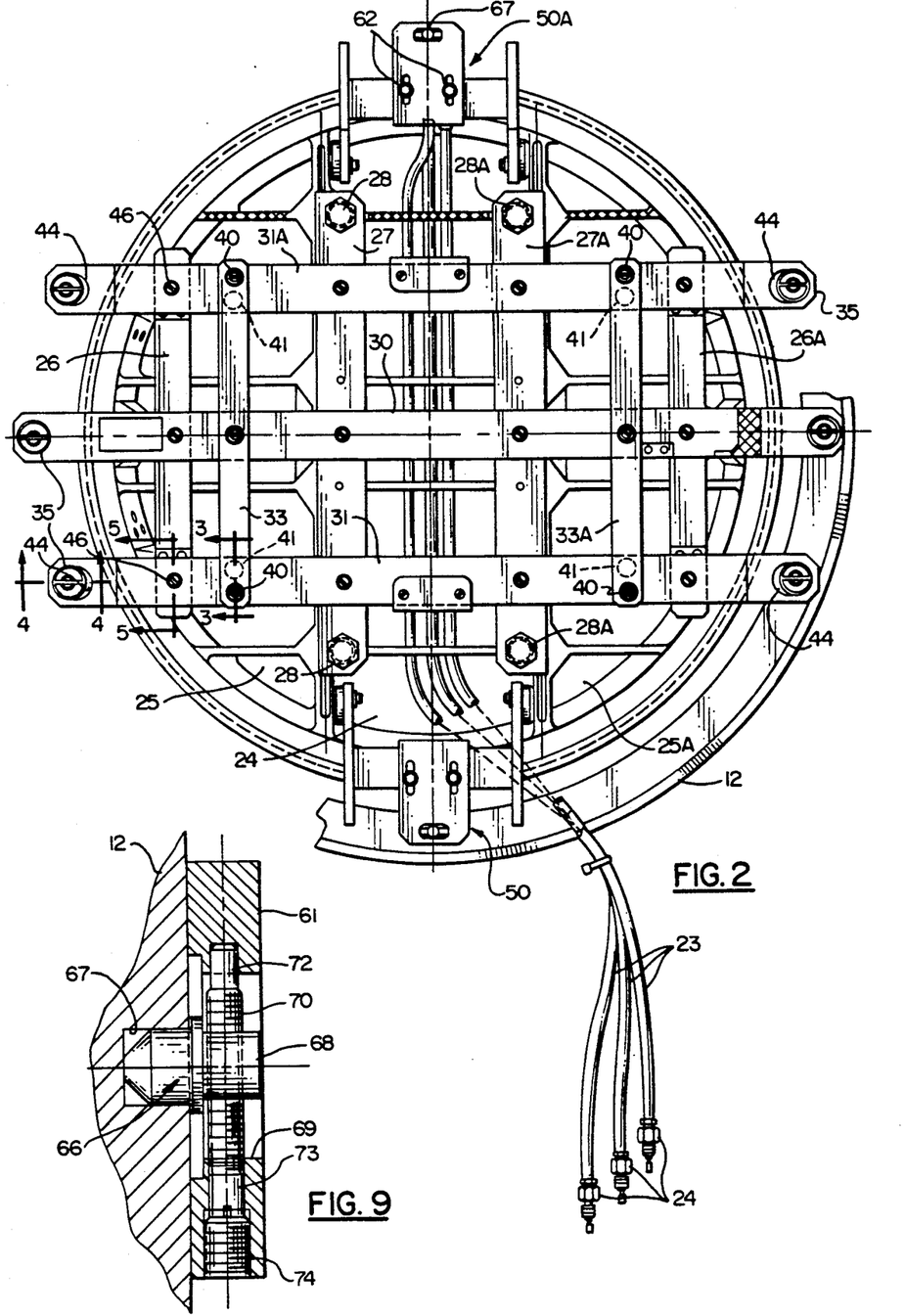
FIG. 2 is a plan view of the dam assembly of the invention from the backside thereof.
FIG. 9 is an enlarged section taken along the line 9—9 of FIG. 6 and further illustrating the means for horizontal adjustment.
Figure 4:
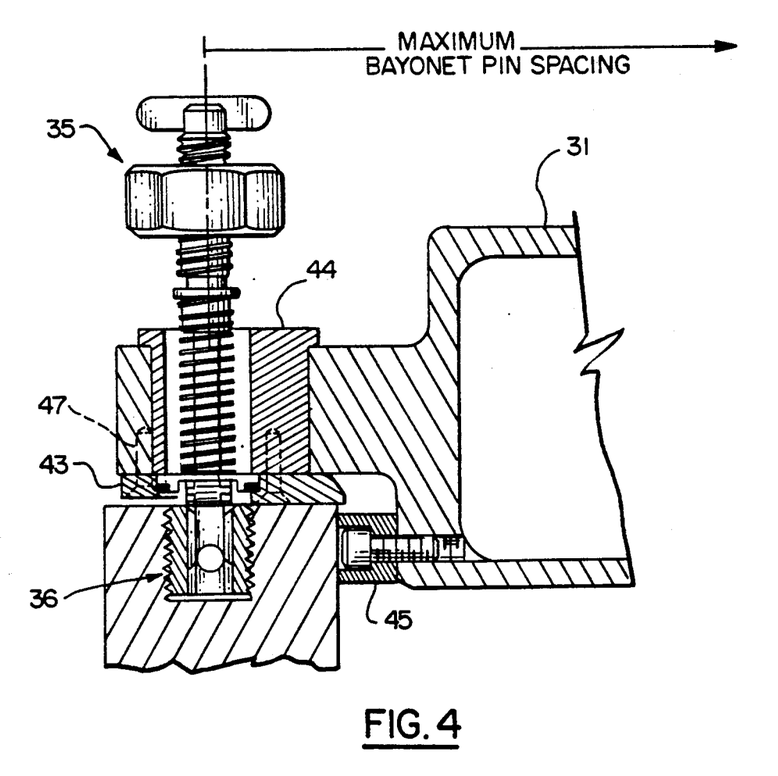
FIG. 4 is an enlarged fragmentary section taken along the line 4—4 of FIG. 2 of one of the bayonet pin adjustment means for securing the support frame to the flange ring and particularly illustrating an eccentric bushing for varying the respective spacing of the bayonet pins at opposite ends of the outer bars of the support frame.

A support frame is disposed transverse to the dam segments 24, 25 and 25A and to the center and outer bars thereof 27, 27A, 26 and 26A as shown particularly in FIG. 2. The support frame includes a center beam 30 and outer beams 31 and 31A. The center and outer beams 30, 31 and 31A are parallel to one another and are adapted to span the ring 12. They are pantographically interconnected by a pair of pivot bars 33 and 33A. At the end of each of the center beam 30 and outer beams 31 and 31A is bayonet pin means 35 one of which is illustrated in FIG. 4. Each of the bayonet pin means 35 is adapted to interlock with bayonet pin receiving means 36 threaded into associated holes in the flange ring 12. The details of the bayonet pin means and their receiving means need not be set forth here because they are fully described in the aforementioned U.S. Pat. No. 4,667,701.

Figure 3:
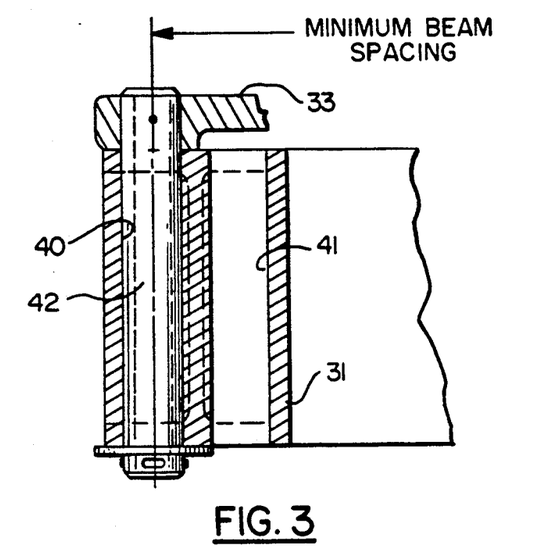
FIG. 3 is an enlarged fragmentary section taken along the line 3—3 of FIG. 2 showing the means for varying the position of the interconnection between the pivot bars and outer beams of the support frame.

As part of the general object of the invention to make the dam assembly as adjustable as possible to conform to various configurations of the flange ring 12, means are provided for varying the location of the interconnections between the outer ends of the pivot bars 33 and 33A and the outer beams 31 and 31A. One of these means is illustrated in FIG. 3 to include alternate inboard and outboard holes 40 and 41 in the associated outer beam 31 or 31A. The pivot bar 33 or 33A has a perpendicular finger 42 at each end and it will be seen that if the finger 42 is inserted in the outboard hole 40 there will be minimum spacing between the outer beams 31 and 31A and if it is inserted in the inboard hole 41 there will be maximum spacing between the outer beams 31 and 31A.

Further adjustment is provided by mounting each of the bayonet pin means 35 in an eccentric bushing 44 in the associated outer end of the outer beam 31 or 31A as shown in FIG. 4. By turning the eccentric bushing 44 and securing it in place by an annulus 43 held by screws 47, the spacing between the bayonet pin means at opposite ends of each outer beam can range between a maximum shown in FIG. 4 to a minimum if the bushing 44 is rotated one hundred eighty degrees.

Suitable selection of the outboard or inboard holes 40 and 41 and the position of the respective eccentric bushings 44 allows the bayonet pin means 35 of the support frame to be located exactly over each of the bayonet pin receiving means 36 on the flange ring 12 regardless of slight variations in the position of the bayonet pin receiving means with respect to the nozzle axis. An appropriately sized block 45 is attached to each end of each beam as shown in FIG. 4 to abut the ring 12 when the support frame is in place. These adjustments are among those which are to be made before installation of the dam.

Figure 5:
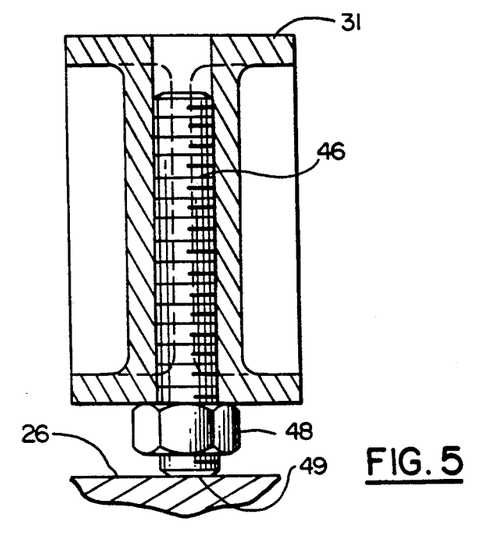
FIG. 5 is an enlarged fragmentary section taken along the line 5—5 of FIG. 2 showing one of the adjustment screws threaded into the frame and presenting an abutment end to the backside of the dam in sliding engagement therewith.

By the apparatus and method hereinafter described the dam assembly is also adjusted before installation to locate the sealing diaphragm 17 at its optimum depth position, which means that the dam segments 24, 25 and 25A and their center bars 27 and 27A and outer bars 26 adn 26A will be moved to a selected position spaced from the beams 30, 31 and 31A of the support frame. Adjustable abutment means illustrated in FIG. 5 are therefore provided on the frame to restrain the dam against outward movement along nozzle axis from the selected depth position but permitting movement of the dam in a plane perpendicular to the nozzle axis so that the dam can also be adjusted horizontally and vertically. The adjustment means shown in FIG. 5 includes an adjustment screw 46 and there are twelve such screws at the crossings of the center and outer beams 30, 31 and 31A with the ends and center of the center bars 27 and 27A and outer bars 28 and 28A (see also FIG. 1). In FIG. 5 the adjustment screw 46 at the crossing of one outer end of the outer bar 26 with the outer beam 31 is shown. The adjustment screw includes an abutment end 49 which is presented to the surface of the outer bar 26 on the backside of the dam in sliding engagement therewith. A nut 48 provides lock means on each adjustment screw 46 for locating the abutment ends coplanar with one another to restrain the dam aganist outward movement along the nozzle axis.

Adjustment means 50 and 50A are provided at the opposite ends of the dam center segment 24 as generally shown in FIG. 2. The adjustment means include adjustable hanger means adapted to rest slideably on the ring 12 while supporting the dam in selected depth positions along the nozzle axis as particularly shown in FIGS. 6 and 7. The adjustment means also include adjustable plate means supporting the hanger bar means and dam in selected vertical positions perpendicular to the nozzle axis as shown particularly in FIG. 6. Pin means adapted to be affixed to the ring 12 and supporting the adjustment plate means and hanger bar means and dam in selected horizontal positions perpendicular to the nozzle axis are also shown in FIG. 6.

Figure 8:
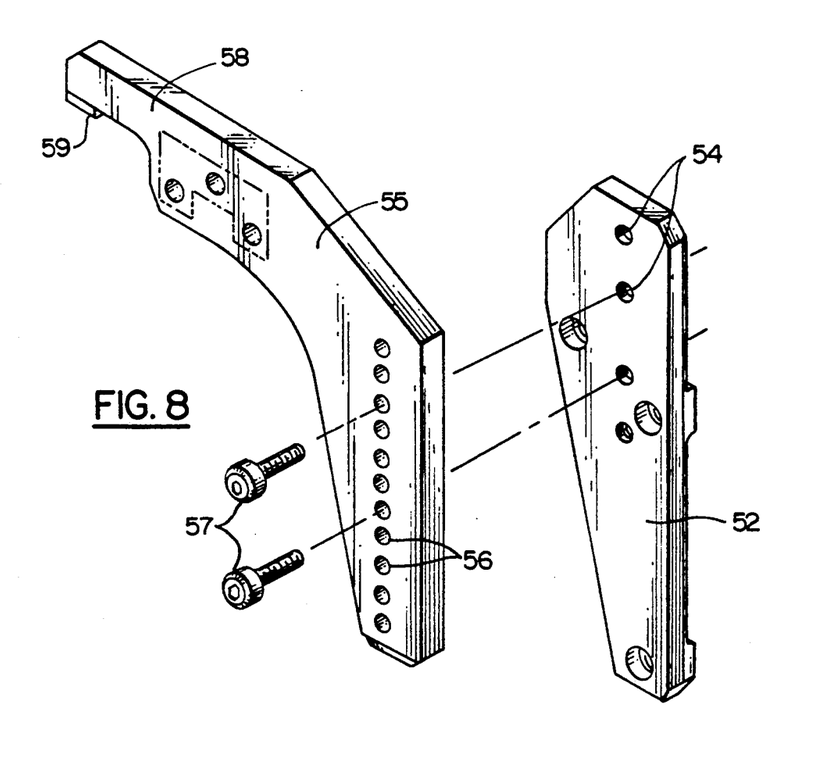
FIG. 8 is an exploded pictorial view of the hanger bar means permitting depth adjustment.

The hanger bar means in each of the ajustment means 50 and 50A includes a pair of mounting plates 52 and 52A screwed to respective side flanges of the dam center segment 24. As shown in FIG. 8 each of the mounting plates 52 and 52A is formed with threaded holes 54 aligned in a row which row is adapted to be parallel to the nozzle axis. Each of the mounting plates 52 and 52A is associated with a respective hanger plate 55 having unthreaded holes 56 therein also aligned in a row adapted to be parallel to the nozzle axis. There are eleven holes 56 in the embodiment shown and four of the holes 54. A pair of socket head cap screws 57 are provided which can be extended through the unthreaded holes 56 into threaded engagment with the holes 54. Each hanger plate 55 is slideable on its mounting plate 52 so that selected pairs of the holes 54 and 56 may be registered with one another. The spacing of the holes 54 and 56 is such that the position of the hanger plate 55 on the mounting plate 52 varies by a slight increment for every pairing of the holes registered together. If one socket head cap screw 57 is inserted through the third hole 56 from the top as shown in FIG. 8 and into the second hole 54 from the top in the mounting plate 52 as also shown in FIG. 8, and the other of the socket head cap screws 57 is inserted through the fifth hole 56 from the bottom in the hanger plate 55 and into the second hole 54 from the bottom in the mounting plate 52, that will give a particular depth position of the hanger plate 55 on the mounting plate 52. Every combination of registered holes 54 and 56 results in a different depth position of the hanger plate 55 on the mounting plate 52.

Figure 7:
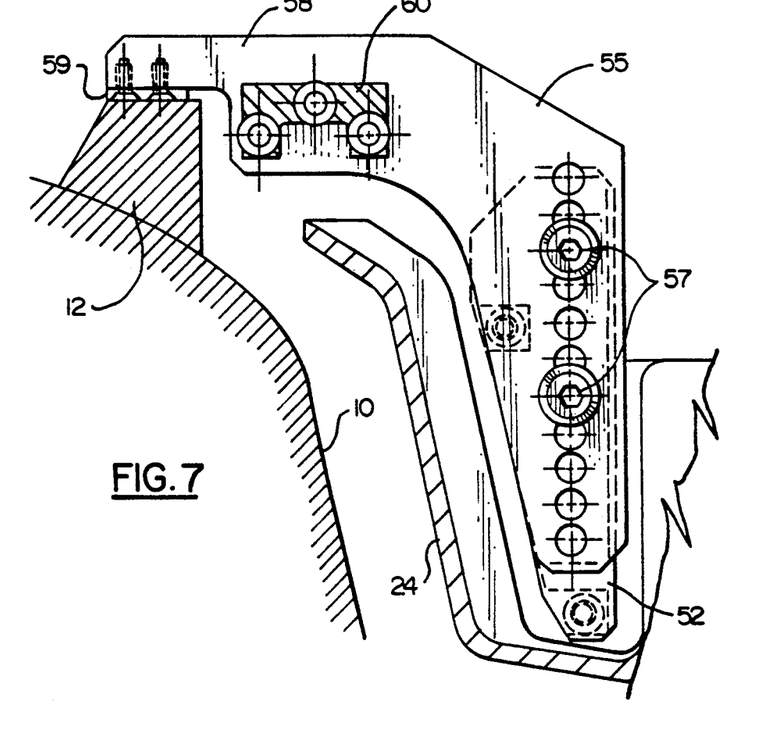
FIG. 7 is an enlarged fragmentary section taken along the line 7—7 of FIG. 6 particularly showing the means for depth adjustment along the nozzle axis.

The hanger plate 55 has an outer end portion 58 which is adapted to rest slideably on the ring 12 as shown particularly in FIG. 7. A shim 59 may be screwed to the underside of the end portion 58 of the hanger plate 55 so as to further adjust the position of the hanger plate 55 on the ring 12 for further variation in the selected depth position of the dam. Thus each of the different depth positions established by selection of the cap screws 57 in registered pairs of the holes 54 and 56 can be further varied by the presence or absence of the shim 59. All together as many as twenty-eight different incrementally varying depth within two or three inches of one another so as to locate the sealing diaphragm 17 of the dam at its optimum depth position within the nozzle depending upon the particular nozzle longitudinal profile which was first determined.

Figure 6:
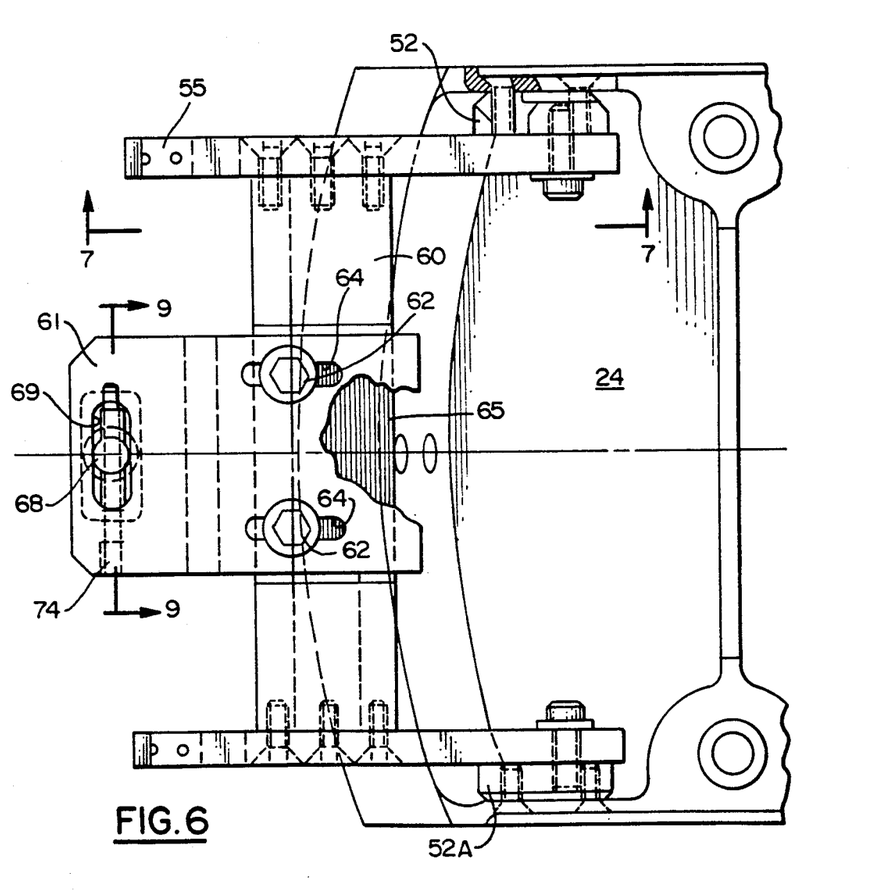
FIG. 6 is an enlarged fragmentary plan view of the adjustment means of the invention at one end of the center segment of the dam particularly illustrating the means for vertical and horizontal adjustment.

The adjustable plate means for supporting the hanger bar means is selected vertical positions includes a tie bar 60 secured between each pair of hanger bars 55 on diametrically opposite sides of the dam as shown in FIGS. 6 and 7. An adjustment plate 61 is disposed across each of the respective. tie bars 60 and is adapted to lie in a plane perpendicular to the nozzle axis. Hexagonal head cap screws 62 with flat washers extend through respective slots 64 in each of the adjustment plates 61 for locking the two together with the adjustment plates in a selected vertical position perpendicular to the nozzle axis. It is preferred that each of the tie bars 60 and adjustment plates 61 engage one another on similarly serrated surfaces 65 for positive interlocking.

The means for adjustment of the horizontal position of the dam includes a pin 66 fitted into an appropriate hole 67 in the ring 12 at opposite ends of the center segment 24 of the dam as shown in detail in FIG. 9. Each of the pins 66 includes a shank end 68 extending from the ring 12. As shown in FIGS. 6 and 9 the outer end of each adjustment plate 61 includes a slot 69 into which the shank end 68 of the pin 66 extends. The shank end 68 of the pin includes a threaded hole through which an adjustment screw 70 is inserted lengthwise within the slot 69. One end 72 of the adjustment screw 70 turns in the end of the slot 69 and the other end 73 of the adjustment screw is adapted to be rotated to move the pin 66 back and forth along the slot 69. Access to the adjustment screw 70 may be had through an opening on the side of the adjustment plate 61 covered by a removable set screw 74, which also holds the screw 70 in its selected position.

The apparatus of the invention is operated in accordance with a method whereby the dam is installed at its optimum sealing position in the nozzle 10 both along the nozzle axis 13 and also horizontally and vertically perpendicular to the nozzle axis. As described previously the nozzle has a particular longtudinal profile flaring to a circular wall opening about which is affixed the flange ring 12 of a particular eccentricity and configuration relative to the opening. The particular longitudinal profile of the nozzle wall and the particular eccentricity and configuration of the flange ring are ascertained beforehand. The method contemplates that when in sealing position the dam will be abutted on its backside by the support frame removably affixed across the ring 12 by the bayonet pin means 35. The hanger bar means on the dam is adjusted so that when the outer end portion 58 of the hanger plate 55 rests on the ring 12 by proper selection of the registered holes 54 and 56, with or without the shim 59, the dam is in its optimum depth position along the nozzle axis. The screws 46 are each fixed in a selected position by their lock nuts 48 so that their abutment ends 49 contact the backside of the center or outer bars 27, 27A, 26 and 26A so that the when the dam is in the aforementioned optimum depth position it is restrained against outward movement along the nozzle axis but is permitted to move in a plane perpendicular to the nozzle axis. Each of the ajustment plates 61 which support the hanger bar means and dam are also adjusted so that the dam is in its optimum vertical sealing position perpendicular to the nozzle axis. The adjustment plate 61 is moved relative to the shank end 68 of the pin 66 back and forth along the slot 69 so that the dam is in its optimum horizontal sealing position perpendicular to the nozzle axis.

By the foregoing method and apparatus all of the various adjustments herein described are made beforehand in accordance with the particular profile and configuration of the nozzle and ring. The person installing the dam first places the pins 66 in their holes in the ring 12 and then places the center dam segment 24 with its attached sealing diaphragm 17 diametrically crosswise in the nozzle opening on the opposed pair of pins 66. He then inserts the dam end segments 25 and 25A and applies the two center bars 27 and 27A to hold the three segments together. All of this is done quickly with no time-consuming assembly of parts. The installer knows as he does this that the sealing diaphragm 17 will be exactly where it should be in the nozzle opening. He then opens the pantograph of the center and outer beams 30, 31 and 31A and quickly attaches the six bayonet pin means 35 at their respective ends to the previously located bayonet pin receiving means 36 in the ring 12. He is assured that each of the bayonet pin means 35 will align exactly with its associated receiving means 36 because of the adjustments previously made in the selection of the inboard and outboard holes 40 and 41 and the position of the various eccentric bushings 44. Having done this the operator can quickly remove himself from the chamber. Typical installation times are in the order of only two minutes, less than half the average installation time of most prior art dam assemblies.

The scope of the invention is to be determined from the claims rather than the foregoing description of one preferred embodiment.

We claim:

1. In a nozzle dam assembly for use in nozzles having nominally varying longitudinal profiles flaring to circular wall openings about which are fixed flange rings of nominally varying eccentricity relative to such openings, said assembly including a circular dam adapted to face into and seal the associated nozzle adjacent its opening and a support frame abutting the backside of the dam and adapted to be removably affixed across the associated ring, the improvement which comprises adjustment means for selectively locating said dam at its optimum sealing position within the nozzle notwithstanding the particular nozzle profile and the particular eccentricity of the ring relative to the opening comprising
    (a) adjustable hanger bars adapted to rest slideably on the ring while supporting the dam in selected depth positions along the nozzle axis,
    (b) adjustable abutments on the frame restraining the dam against outward movement along the nozzle axis from the selected depth position determined by the hanger bars but permitting movement of the dam in a plane perpendicular to the nozzle axis,
    (c) adjustable plates supporting the hanger bars and dam in selected vertical positions perpendicular to the nozzle axis, and
    (d) pins adapted to be affixed to the ring and support the adjustable plates and bars and dam in selected horizontal positions perpendicular to the nozzle axis.

2. In a nozzle dam assembly according to claim 1 wherein the dam is of composite form adapted to be assembled directly in the nozzle opening, the improvement further comprising
    (a) a center dam segment disposable diametrically relative to the opening with one of said adjustment means at each end thereof,
    (b) a chordal end dam segment locatable to each side of and adjoining the center segment,
    (c) a circular sealing diaphragm affixed to the center segment and disposable around the periphery of and across all the segments, and
    (d) bars adapted to be aligned with and to interconnect the segments and engage the adjustable abutments on the frame,
    (e) said support frame being disposed transverse to the dam segments and bars,
    (f) whereby the adjustment means are first set in conformity with the particular nozzle profile and the particular eccentricity of the ring relative to the opening and the center segment is then located on the ring by the pins with the diaphragm preaffixed followed by connection of the end segments alongside the center segment and against the diaphragm and finally by attachment to the ring of the support frame transverse to the bars.

3. A nozzle dam assembly according to claim 1 wherein the hanger bars comprise
    (a) mounting plates diameterically opposed on the dam each having holes therein aligned in a row adapted to be parallel to the nozzle axis,
    (b) hanger plates slideable on the respective mounting plates and each also having holes therein aligned in a row adapted to be parallel to the nozzle axis so that selected pairs of the holes in the hanger and mounting plates can be registered with one another,
    (c) connectors insertable through the registered pairs of holes to secure the hanger and mounting plates together,
    (d) the hanger plates resting on the ring so that the mounting plates and dam are supported in selected depth positions along the nozzle axis depending upon the selected pair of registered holes in which the connectors are inserted.

4. A nozzle dam assembly according to claim 3 which includes a shim of selected thickness between the ring and each hanger plate resting thereon for further variation in the selected depth position of the dam.

5. A nozzle dam assembly according to claim 1 wherein the adjustable abutments comprise
    (a) a plurality of adjustment screws threaded into the frame and presenting abutment ends to the backside of the dam in sliding engagement therewith, and
    (b) locks on the respective adjustment screws for locating the abutment ends coplanar with one another to restrain the dam against outward movement along the nozzle axis.

6. A nozzle dam assembly according to claim 1 wherein the adjustable plates comprise
    (a) tie bars affixed to said hanger bars on diametrically opposite sides of the dam,
    (b) adjustment plates disposed across the respective tie bars adapted to be in a plane perpendicular to the nozzle axis, and
    (c) a screw and vertical slot in each pair of adjustment plates and tie bars for locking the two together with the adjustment plates in a selected vertical position perpendicular to the nozzle axis.

7. A nozzle dam assembly according to claim 6 wherein each pair of adjustment plates and tie bars engage one another on similarly serrated surfaces for positive interlocking.

8. A nozzle dam assembly according to claim 1 wherein
(a) the pins are insertable in holes on diametrically opposite sides of the ring,
(b) horizontal slots are provided in the adjustable plates into which the respective pins extend, and
(c) locks are provided for locking each pin in a selected fixed position in its respective horizontal slot.

9. In a nozzle dam assembly according to claim 1 wherein the support frame further includes parallel beams adapted to span the ring which are pantographically interconnected by pivot bars and bayonet pins on the ends of the beams attachable to bayonet receivers located at fixed positions around the ring, the improvement further comprising
(a) means for varying the location of at least some of the interconnections between the beams and pivot bars, and
(b) adjustable eccentric bushings within which at least some of the pins are mounted on the beam ends,
(c) whereby the bayonet pins on the beams are registerable with the bayonet receivers on the ring notwithstanding variations in the positions of the bayonet pin receivers on the ring.

10. In a nozzle dam assembly for use in nozzles having nominally varying longitudinal profiles flaring to circular wall openings about which are fixed flange rings of nominally varying eccentricity relative to such openings, said assembly including a circular dam adapted to face into and seal the associated nozzle adjacent its opening and a support frame abutting the backside of the dam and adapted to be removably affixed across the associated ring, the improvement which comprises adjustment means for selectively locating said dam at its optimum sealing position within the nozzle notwithstanding the particular nozzle profile and the particular eccentricity of the ring relative to the opening comprising
(a) adjustable hanger bars adapted to rest slideably on the ring while supporting the dam in selected depth positions along the nozzle axis comprising
 i. mounting plates diametrically opposed on the dam with each having holes therein aligned in a row adapted to be parallel to the nozzle axis,
 ii. hanger plates slideable on the respective mounting plates and each also having holes therein aligned in a row adapted to be parallel to the nozzle axis so that selected pairs of the holes in the hanger and mounting plates can be registered with one another,
 iii. connectors insertable through the registered pairs of holes to secure the hanger and mounting plates together,
 iv. the hanger plates resting on the ring so that the mounting plates and dam are supported in selected depth positions along the nozzle axis depending upon the selected pair of registered holes in which said connectors are inserted;
(b) adjustable abutments on the frame restraining the dam against outward movement along the nozzle axis from the selected depth position determined by the hanger bars but permitting movement of the dam in a plane perpendicular to the nozzle axis comprising
 i. a plurality of adjustment screws threaded into the frame and presenting abutment ends to the backside of the dam in sliding engagement therewith, and
 ii. locks on the respective adjustment screws for locating the abutment ends coplanar to restrain the dam against outward movement along the nozzle axis;
(c) adjustable plates supporting the hanger bars and dam in selected vertical positions perpendicular to the nozzle axis comprising
 i. tie bars affixed between respective pairs of hanger plates on diametrically opposite sides of the dam;
 ii. adjustment plates disposed across the respective tie bars adapted to be in a plane perpendicular to the nozzle axis, and
 iii. a screw and vertical slot in each pair of adjustment plates and tie bars for locking the two together with the adjustment plates in a selected vertical position perpendicular to the nozzle axis; and
(d) pins adapted to be affixed to the ring and supporting the adjustable plates and hanger bars and dam in selected horizontal positions perpendicular to the nozzle axis and being insertable in holes on diametrically opposite sides of the ring,
(e) horizontal slots in the adjustable plates into which the respective pins extend, and
(f) locks for locking each pin in a selected fixed position in its respective horizontal slot.

11. In a nozzle dam assembly according to claim 10 wherein the dam is of composite form adapted to be assembled directly in the nozzle opening, the improvement further comprising
(a) a center dam segment disposable diametrically relative to the opening with one of said adjustment means at each end thereof,
(b) a chordal end dam segment locatable to each side of and adjoining the center segment,
(c) a circular sealing diaphragm affixed to the center segment and disposable around the periphery of and across all the segments, and
(d) bars adapted to be aligned with and to interconnect the segments and engage the abutment ends of the adjustment screws on the abutments on the frame,
(e) said support frame being disposed transverse to the dam segments and bars,
(f) whereby the adjustment means are first set in conformity with the particular nozzle profile and the particular eccentricity of the ring relative to the opening and the center segment is then located on the ring by the pins with the diaphragm preaffixed followed by connection of the end segments alongside the center segment and against the diaphragm and finally by attachment to the ring of the support frame transverse to the bars.

12. A nozzle dam assembly according to claim 10 which includes a shim of selected thickness between the ring and each hanger plate resting thereon for further variation in the selected depth position of the dam.

13. A nozzle dam assembly according to claim 10 wherein each pair of adjustment plates and tie bars engage one another on similarly serrated surfaces for positive interlocking.

14. In a nozzle dam assembly according to claim 10 wherein the support frame further includes parallel beams adapted to span the ring which are pantographically interconnected by pivot bars and bayonet pins on the ends of the beams attachable to bayonet receivers located at fixed positions around the ring, the improvement further comprising (a) means for varying the location of at least some of the interconnections between the beams and pivot bars, and (b) adjustable eccentric bushings within which at least some of the bayonet pins are mounted on the beam ends, (c) whereby the bayonet pins on the beams are registerable with the bayonet receivers on the ring notwithstanding variations in the positions of the bayonet pin receivers on the ring.

15. A method of installing a circular dam at an optimum sealing position in a nozzle both along the nozzle axis and also horizontally and vertically perpendicular to the nozzle axis, said nozzle having a particular longitudinal profile flaring to a circular wall opening about which is fixed a flange ring of a particular eccentricity relative to the opening, the dam being abutted on its backside when in sealing position by a support frame removably affixed across the ring, which comprises (a) adjusting hanger bars on the dam so that when the hanger bars rest slideably on the ring the dam is in its optimum depth position along the nozzle axis, (b) adjusting abutments on the frame so that when the dam is in said optimum depth position it is restrained against outward movement along the nozzle axis but is permitted to move in a plane perpendicular to the nozzle axis, (c) adjusting plates which support the hanger bars and dam so that the dam is in its optimum vertical sealing position perpendicular to the nozzle axis, (d) supporting the plates and hanger bars and dam by pins affixed to the ring, and (e) adjusting the plates relative to the pins so that the dam is in its optimum horizontal sealing position perpendicular to the nozzle axis.

* * * * *